(12) United States Patent
Howells

(10) Patent No.: US 8,869,501 B2
(45) Date of Patent: Oct. 28, 2014

(54) CLAMPING ASSEMBLY

(75) Inventor: Philip T. Howells, Bristol (GB)

(73) Assignee: Rolls-Royce PLC, London (GB)

( * ) Notice: Subject to any disclaimer, the term of this patent is extended or adjusted under 35 U.S.C. 154(b) by 720 days.

(21) Appl. No.: 13/159,932

(22) Filed: Jun. 14, 2011

(65) Prior Publication Data

US 2012/0006037 A1 Jan. 12, 2012

(30) Foreign Application Priority Data

Jul. 6, 2010 (GB) .................................. 1011370.2

(51) Int. Cl.
*F16C 43/04* (2006.01)
*F01D 25/16* (2006.01)
*F16B 2/06* (2006.01)

(52) U.S. Cl.
CPC ...................................... *F16B 2/065* (2013.01)
USPC .......... 60/39.08; 184/6.11; 384/559; 384/562

(58) Field of Classification Search
USPC ......... 60/39.08, 796, 798; 184/6.11; 384/513, 384/517, 539–540, 558–559, 562, 583–585, 384/600
See application file for complete search history.

(56) References Cited

U.S. PATENT DOCUMENTS

| 4,502,274 | A | * | 3/1985 | Girault | .......................... 60/39.08 |
| 5,529,403 | A | * | 6/1996 | Martinie | ........................ 384/585 |
| 2005/0052072 | A1 | * | 3/2005 | Schlanger | .................. 301/110.5 |

* cited by examiner

*Primary Examiner* — Andrew Nguyen
(74) *Attorney, Agent, or Firm* — Oliff PLC

(57) ABSTRACT

A clamping assembly (2) adapted to clamp a component (4), the assembly comprising: first and second clamping members (10, 20), the first and second clamping members being movable with respect to one another in a first direction to selectively clamp the component therebetween; and a bearing element (30) positionable between the component and one of the first and second clamping members, the bearing element being configured to permit relative movement between the component and one of the first and second clamping members in a second direction.

10 Claims, 1 Drawing Sheet

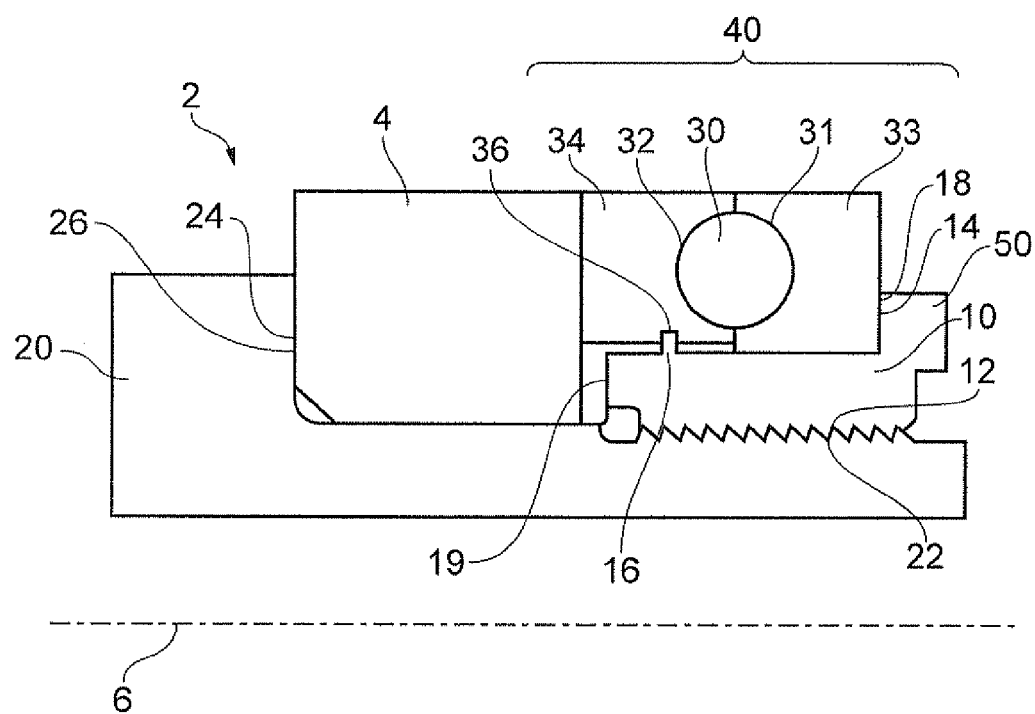

CLAMPING ASSEMBLY

This invention relates to a clamping assembly and particularly but not exclusively relates to a clamping assembly for a gas turbine engine.

BACKGROUND

Gas turbine engines typically require numerous components to be clamped or bolted to other components. Such components are often (but not exclusively) bearings, stub shafts, discs or gears and these components may, for example, require retention onto a shaft or into a housing.

Currently, standard shaft nuts may be used to secure a component onto a shaft. For example, the shaft nut may be threaded onto the shaft and the component may be held between the shaft nut and an abutment shoulder on the shaft. In order to assemble nut stacks, it may be required to compress the nut stack, to ensure all of the nut stack is fully seated. This is generally done as part of the nut tightening procedure, although there may be occasions when this is done as a separate operation, with a different assembly method or tooling.

There may be friction between the threads of the shaft and the shaft nut and at the contact faces between either side of the component and the shaft abutment shoulder and the shaft nut respectively. However, with current methods there may be galling (e.g. a form of surface damage between sliding faces) and/or surface distress at the contact faces between the component and the shaft abutment shoulder and the shaft nut.

In this respect, lubricants, such as oil or graphite grease may be used to reduce friction at the contact faces between the component and the shaft abutment shoulder and the shaft nut. However, depending on the materials being used and the operating temperatures involved, it may not be possible to use low coefficient of friction lubricants such as graphite grease. Furthermore, the application of lubricants may not be uniform and they may need replenishing with time.

The present invention therefore seeks to address these issues.

STATEMENTS OF INVENTION

According to a first example of the present disclosure there is provided a clamping assembly adapted to clamp a component, the assembly comprising: first and second clamping members, the first and second clamping members being movable with respect to one another in a first direction to selectively clamp the component therebetween; and a bearing element positionable between the component and one of the first and second clamping members, the bearing element being configured to permit relative movement between the component and one of the first and second clamping members in a second direction.

The first and second directions may be substantially perpendicular.

The bearing element may be configured to permit relative rotation between the component and one of the first and second clamping members.

The clamping assembly may further comprise first and second bearing surfaces. The bearing element may be disposed between the first and second bearing surfaces. The bearing element may comprise balls or rollers disposed between the first and second bearing surfaces.

The first bearing surface may be integral with one of the first and second clamping members.

The clamping assembly may further comprise a first bearing member. The first bearing member may comprise the first bearing surface. The clamping assembly may further comprise a second bearing member. The second bearing member may comprise the second bearing surface.

The bearing element and first and second bearing surfaces may together form a bearing. The bearing may comprise a thrust bearing.

The bearing element may be disposed between the second bearing member and the first clamping member. The second bearing member may abut the component. The second bearing member may be limited from moving with respect to the first clamping member in the first direction. The clamping assembly may further comprise a retention means or restrainer adapted to limit movement of the second bearing member with respect to the first clamping member in the first direction and permit movement of the second bearing member with respect to the first clamping member in the second direction.

One of the first clamping member and the second bearing member may comprise a protruding portion. The other of the first clamping member and the second bearing member may comprise a receiving portion. The protruding and receiving portions may be arranged to limit the second bearing member from moving with respect to the first clamping member in the first direction and may permit movement of the second bearing member with respect to the first clamping member in the second direction.

The first and second clamping members may rotate with respect to one another. The first and second clamping members may each comprise threaded portions arranged to engage one another.

A turbomachine may comprise the above-mentioned clamping assembly. A gas turbine may comprise the above-mentioned clamping assembly.

According to a second example of the present disclosure there is provided a method of clamping a component between first and second clamping members, the method comprising: providing a bearing element between the component and one of the first and second clamping members, moving the first and second clamping members with respect to one another in a first direction to selectively clamp the component therebetween; and permitting relative movement between the component and one of the first and second clamping members in a second direction by virtue of the bearing element.

The present disclosure may advantageously limit any galling issues at the interface between the component to be clamped and one of the first and second clamping members.

BRIEF DESCRIPTION OF THE DRAWINGS

For a better understanding of the present invention, and to show more clearly how it may be carried into effect, reference will now be made, by way of example, to the accompanying drawing, in which:—

FIG. 1 is a partial sectional view of a clamping assembly according to an example of the present disclosure.

DETAILED DESCRIPTION

With reference to FIG. 1, a clamping assembly 2 according to an example of the present disclosure, comprises a first clamping member 10 and a second clamping member 20. The first and second clamping members 10, 20 may be arranged to selectively clamp a component 4 between the first and second clamping members 10, 20. The first and second clamping members 10, 20 may be movable with respect to one another to selectively clamp the component 4 therebetween. The first and second clamping members 10, 20 may be movable with respect to one another in a first direction.

The first and second clamping members 10, 20 may be disposed about a centreline 6. For example, the first and second clamping members 10, 20 may be at least partially tubular and may have a substantially circular cross-section. Similarly, the component 4 to be clamped may be disposed about the centreline 6. The component 6 may also be at least partially tubular and may have a substantially circular cross-section.

The first and second clamping members 10, 20 may comprise first and second threads 12, 22 respectively. The threads 12, 22 may take any previously-proposed form. The first thread 12 on the first clamping member 10 may be positioned to engage the second thread 22 on the second clamping member 20. In the example shown, the first thread 12 may be provided on an inner facing surface of the first clamping member 10. By contrast, the second thread 22 may be provided on an outer facing surface of the second clamping member 20.

The first and second clamping members 10, 20 may be rotatable with respect to one another. By virtue of the first and second threads 12, 22, the first and second clamping members may move in an axial direction, e.g. first direction, with respect to one another when the first and second clamping members 10, 20 are rotated with respect to one another. For example, the first clamping member 10 may move towards the second clamping member 20 in an axial direction when the first clamping member 10 is rotated with respect to the second clamping member 20. Relative movement of the first and second clamping members 10, 20 in the first direction provides a clamping force to clamp the component 4 between the first and second clamping members 10, 20.

The clamping assembly 2 may further comprise one or more bearing elements 30. The bearing elements 30 may be clamped with the component 4 between the first and second clamping members 10, 20. The bearing elements 30 may be positionable between the component 4 and one of the first and second clamping members 10, 20. In the example shown, the bearing element is positioned between the component 4 and the first clamping member 10. The bearing elements 30 may be configured to permit relative movement, e.g. rotation, between the component 4 and one of the first and second clamping members 10, 20. The relative movement between the component 4 and one of the first and second clamping members 10, 20 may be in a second, e.g. circumferential, direction. The first and second directions may be substantially perpendicular.

The bearing elements 30 may be disposed about the centreline 6. The bearing elements may be configured to permit relative rotation between the component 4 and one of the first and second clamping members 10, 20. The bearing elements 30 may rotate, e.g. about an axis with a component parallel to the surfaces either side of the bearing element. The bearing elements 30 may comprise balls or rollers, e.g. cylindrical or conical rollers. In the case of their being a plurality of bearing elements 30, the bearing elements may be regularly spaced in a circumferential fashion about the centreline 6. The bearing elements may be held in a cage to ensure that they are regularly spaced apart.

The clamping assembly 2 may further comprise first and second bearing surfaces 31, 32. The bearing elements 30 may be disposed between the first and second bearing surfaces 31, 32. The first and/or second bearing surfaces 31, 32 may comprise bearing races, for example a groove for receiving the bearing elements 30. The first bearing surface 31 may be rotationally fixed with respect to the first clamping member 10. By contrast, the second bearing surface 32 may be rotationally free with respect to the first clamping member 10.

The clamping assembly 2 may further comprise a first bearing member 33 and the first bearing member 33 may comprise the first bearing surface 31. Similarly, the clamping assembly 2 may further comprise a second bearing member 34 and the second bearing member 34 may comprise the second bearing surface 32. The first bearing member 33 may be rotationally fixed with respect to the first clamping member 10, e.g. by virtue of splines or an interference fit. By contrast, the second bearing member 34 may be rotationally free with respect to the first clamping member 10.

In an alternative example (not shown), the first bearing surface 31 may be integral with one of the first and second clamping members 10, 20. Likewise, the second bearing surface 32 may be integral with the component 4.

A bearing 40 provided between the component 4 and one of the first and second clamping members 10, 20 may comprise one or more bearing elements 30 and the first and second bearing surfaces 31, 32, which may be formed on the first and/or second bearing members 33, 34. The bearing 40 may comprise a thrust bearing.

The first clamping member 10 may comprise a first abutment surface 14 for engaging the first bearing member 33. The second clamping member 20 may comprise a second abutment surface 24 for engaging the component 4. The component 4, bearing element 30 and first and second bearing members 33, 34 may be clamped between the first and second abutment surfaces 14, 24.

The first abutment surface 14 may be formed by a first shoulder 18 in the first clamping member 10. The first shoulder 18 may be set back from an end face 19 of the first clamping member 10. Accordingly, the first and/or second bearing members 33, 34 may be disposed about a portion of the first clamping member 10. The second abutment surface 24 may be formed by a second shoulder 26 in the second clamping member 20. The second shoulder 26 may be set back from an end face of the second clamping member 20.

The bearing elements 30 may be disposed between the second bearing member 34 and the first clamping member 10 and the second bearing member 34 may be limited from moving with respect to the first clamping member 10 in the first, e.g. axial, direction by virtue of an optional retention means. The retention means may permit movement of the second bearing member 20 in the second, e.g. radial, direction. The retention means may secure the bearing 40 to the first clamping member 10 prior to assembly of the clamping assembly 2.

By way of example, one of the first clamping member 10 and the second bearing member 34 may comprise a protruding portion 16 and the other of the first clamping member 10 and the second bearing member 34 may comprise a receiving portion 36. The protruding and receiving portions 16, 36 may be arranged to limit the second bearing member 34 from moving with respect to the first clamping member 10 in the first direction. By contrast, the protruding and receiving portions 16, 36 may permit movement of the second bearing member 34 with respect to the first clamping member 10 in the second direction. The protruding portion 16 may comprise an annulet and the receiving portion 36 may comprise an annular groove. The receiving portion 36 may receive the protruding portion 16. Alternatively, any other retention means known by persons skilled in the art, e.g. a nut threaded onto an outer surface of the first clamping member 10 to axially limit movement of the second bearing member 34, may be used.

The clamping assembly 2 may further comprise one or more formations 50, e.g. spanner flats or protrusions, provided on the first clamping member 10. The formations 50 may be suitable for engagement with a tool.

As shown in FIG. 1, the second clamping member 20 may comprise a shaft and the first clamping member 10 may comprise a nut with the component 4 clamped therebetween. However, according to a further example of the present disclosure (not shown), the second clamping member may comprise a housing, which may be hollow. The first clamping member may fit inside the second clamping member. The housing may comprise an inner facing thread, which an outer facing thread on the first clamping member 10 may engage. In other words, the component may be clamped to a housing instead of a shaft. The clamping assembly of this further example is otherwise substantially the same as that for the first example, for example, the clamping assembly may further comprise a bearing element disposed between the component and one of the first clamping member and the second clamping member.

To assemble the clamping assembly 2, the component 4 may be abutted against the second abutment surface 24 of the second clamping member 20. The first clamping member 10, around which the bearing 40 may be located, may then be threaded onto the second clamping member 20. Alternatively, the bearing 40, may be placed adjacent to the component 4 before threading the first clamping member 10 onto the second camping member 20. The clamping assembly 2 is tightened by further rotating the first clamping member 10 with respect to the second clamping member 20, thereby moving the first clamping member 10 closer to the second abutment surface 24 of the second clamping assembly 20. The resulting clamping force in the first direction holds the component between the first and second abutment surfaces 14, 24 of the first and second clamping members 10, 20.

As the component 4 is being clamped, the bearing 40 limits the circumferential force transmitted from the first clamping member 10 to the component 4. As a result there is limited relative motion between the component 4 and the second abutment surface 24 of the second component 20 and the second bearing member 34. Any friction between the components and the possibility of galling occurring is therefore reduced. Furthermore, the torque required to assemble the components may also be reduced since the friction at the interfaces is reduced (although there will still be friction at the threads). This may allow the first clamping member 10 to be tightened on to the second clamping member 20 without the need for any special tooling.

Once the component 4 is clamped, rotation of the component 4 with respect to the first and second clamping members 10, 20 may be limited by virtue of the clamping force between the second abutment surface 24 of the second component 20 and a corresponding surface on the component 4.

The present disclosure is not restricted to gas turbines and is applicable to any machinery requiring high clamp loads and where galling may be an issue.

The invention claimed is:

1. A clamping assembly adapted to clamp a component, the assembly comprising:
   first and second clamping members, the first and second clamping members being movable with respect to one another in a first direction to selectively clamp the component therebetween;
   first and second bearing members, the first bearing member comprising a first bearing surface, and the second bearing member comprising a second bearing surface; and a bearing element positionable between the component and one of the first and second clamping members, the bearing element being configured to permit relative movement between the component and one of the first and second clamping members in a second direction before a final clamping position is reached, the bearing element being disposed between the first and second bearing members,
   wherein, in use, the first clamping member, the first bearing member, the bearing element, the second bearing member, the component, and the second clamping member are arranged in sequence and wherein one of the first clamping member and the second bearing member comprises a protruding portion and the other of the first clamping member and the second bearing member comprises a receiving portion, the protruding and receiving portions being arranged to limit the second bearing member from moving with respect to the first clamping member in the first direction and permit movement of the second bearing member with respect to the first clamping member in the second direction.

2. The clamping assembly of claim 1, wherein the first and second directions are substantially perpendicular.

3. The clamping assembly of claim 1, wherein the bearing element is configured to permit relative rotation between the component and one of the first and second clamping members.

4. The clamping assembly of claim 1, wherein the bearing element comprises balls or rollers disposed between the first and second bearing surfaces.

5. The clamping assembly of claim 1, wherein the first bearing surface is integral with one of the first and second clamping members.

6. The clamping assembly as claimed in claim 1, wherein the first and second clamping members rotate with respect to one another.

7. The clamping assembly as claimed in claim 1, wherein the first and second clamping members each comprise threaded portions arranged to engage one another.

8. A turbomachine comprising a clamping assembly as claimed in claim 1.

9. A gas turbine comprising a clamping assembly as claimed in claim 1.

10. A method of clamping a component between first and second clamping members, the method comprising:
    providing a bearing element between the component and one of the first and second clamping members,
    providing first and second bearing members, the first bearing member comprising a first bearing surface, and the second bearing member comprising a second bearing surface, moving the first and second clamping members with respect to one another in a first direction to selectively clamp the component therebetween,
    permitting relative movement between the component and one of the first and second clamping members in a second direction by virtue of the bearing element, before a final clamping position is reached, and
    arranging the first clamping member, the first bearing member, the bearing element, the second bearing member, the component, and the second clamping member in sequence, wherein one of the first clamping member and the second bearing member comprises a protruding portion and the other of the first clamping member and the second bearing member comprises a receiving portion, the protruding and receiving portions being arranged to limit the second bearing member from moving with respect to the first clamping member in the first direction and permit movement of the second bearing member with respect to the first clamping member in the second direction.

\* \* \* \* \*